United States Patent
Gaeng et al.

(10) Patent No.: US 8,857,904 B2
(45) Date of Patent: Oct. 14, 2014

(54) HEAD-REST OF A VEHICLE SEAT

(71) Applicants: Fachhochschule Kaiserslautern, Kaiserslautern (DE); Universitaet des Saarlandes, Saarbruecken (DE); Hochschule Fresenius, Idstein (DE)

(72) Inventors: Lutz-Achim Gaeng, Heilbronn (DE); Peter Muench, Goetzenbruck (FR); Hanno Felder, Saarbruecken (DE); Christoph Krick, Hornburg (DE); Sebastian Schlueter, Zweibruecken (DE); Benjamin Schaal, Zweibruecken (DE); Frank Kalka, Saarlouis (DE); Michael Otte, Zweibruecken (DE); Ralf Goutier, Pirmasens (DE); Markus Zimmer, Neunkirchen (DE); Vera Waiz, Zweibruecken (DE); Paul Schatke, Zweibruecken (DE); Susanne Ehmer, Herxheim (DE); Stefan Meyer, Breitfurt (DE); Frank Klein, Reisbach (DE)

(73) Assignees: Fachhochschule Kaiserslautern, Kaiserslautern (DE); Universitaet des Saarlandes, Saarbruecken (DE); Hochschule Fresenius, Idstein (DE)

(*) Notice: Subject to any disclaimer, the term of this patent is extended or adjusted under 35 U.S.C. 154(b) by 0 days.

(21) Appl. No.: 13/919,183

(22) Filed: Jun. 17, 2013

(65) Prior Publication Data
US 2013/0278028 A1  Oct. 24, 2013

Related U.S. Application Data

(63) Continuation of application No. PCT/EP2011/006345, filed on Dec. 15, 2011.

(30) Foreign Application Priority Data

Dec. 15, 2010 (DE) .......... 10 2010 054 651

(51) Int. Cl.
| B60N 2/42 | (2006.01) |
| B60R 22/28 | (2006.01) |
| B60N 2/427 | (2006.01) |
| B60N 2/48 | (2006.01) |

(52) U.S. Cl.
CPC .......... *B60N 2/42709* (2013.01); *B60N 2/4885* (2013.01); *B60N 2/4882* (2013.01)
USPC ..................... 297/216.12; 297/391

(58) Field of Classification Search
USPC ..................... 297/216.12, 391, 404
See application file for complete search history.

(56) References Cited

U.S. PATENT DOCUMENTS 2,864,433 A * 12/1958 Schnoor .......... 297/404
5,961,182 A * 10/1999 Dellanno .......... 297/216.12
(Continued)

FOREIGN PATENT DOCUMENTS

DE 4335778 * 4/1995
DE 195 09 014 A1 9/1996
(Continued)

*Primary Examiner* — Philip Gabler
(74) *Attorney, Agent, or Firm* — Muncy, Geissler, Olds & Lowe, P.C.

(57) ABSTRACT

A head-rest of a vehicle seat with a deformable central supporting body which forms an impact zone for the head of a vehicle occupant and into which the kinetic energy of the head in the event of an accident is admitted. On both sides of the impact zone the central supporting bodies are joined by lateral supporting surfaces which are extendable out of the plane of the head-rest in the direction of travel in order to laterally support the head. In order to avoid or at least to reduce the risk of a cervical-spine whiplash injury, it is proposed according to the invention that the head-rest comprises a device for absorbing the energy admitted into the central supporting body and for outputting the absorbed energy in order to activate lateral supporting surfaces.

14 Claims, 7 Drawing Sheets

(56) References Cited

U.S. PATENT DOCUMENTS

| | | | |
|---|---|---|---|
| 6,158,812 A * | 12/2000 | Bonke | 297/391 |
| 6,513,871 B2 * | 2/2003 | Bartels | 297/216.12 |
| 6,692,071 B2 * | 2/2004 | Fowler | 297/216.12 |
| 7,293,828 B2 * | 11/2007 | Yoshida | 297/216.11 |

FOREIGN PATENT DOCUMENTS

| | | | |
|---|---|---|---|
| EP | 142822 | * | 5/1985 |
| FR | 2829621 | * | 7/1996 |

* cited by examiner

HEAD-REST OF A VEHICLE SEAT

This nonprovisional application is a continuation of International Application No. PCT/EP2011/006345, which was filed on Dec. 15, 2011, and which claims priority to German Patent Application No. DE 10 2010 054 651.8, which was filed in Germany on Dec. 15, 2010, and which are both herein incorporated by reference.

BACKGROUND OF THE INVENTION

1. Field of the Invention

The present invention relates to a head rest for a vehicle seat.

2. Description of the Background Art

A frequent type of injury in motor vehicle accidents, in particular in rear-end collisions, is the cervical spine whiplash injury. This is caused by the fact that, during an accident, the abrupt acceleration of the vehicle occupants in the direction of travel results in an extreme extension movement of the head, which is overlaid by a simultaneous rotary and wobbling movement, usually around multiple spatial axes. As a result, the spinal neck musculature is overextended, which ultimately results in the aforementioned cervical spine whiplash injury.

To counteract this polyaxial wobbling movement, a headrest is known from DE 195 09 014, in which upper and lateral supporting bodies are extended in the direction of travel to stabilize the head. The supporting bodies are activated by an external drive, which is set in motion by a triggering sensor. The additional structural complexity caused by the external drive, including the associated components, which makes the headrest more expensive, has proven to be disadvantageous. Since the additional components must be accommodated in the headrest or the vehicle seat, the worthwhile implementation of a headrest of a vehicle seat having a compact structure is problematic.

SUMMARY OF THE INVENTION

It is therefore an object of the present invention to provide a headrest for a vehicle seat by means of which the risk of injury to the vehicle occupants in the event of a collision between two vehicles is further reduced effectively and at economically justifiable expense.

The basic idea of an embodiment of the invention is to absorb the kinetic energy of the head when it is thrust into a head rest, using suitable means, and to convert this energy directly into driving energy for generating lateral supporting surfaces. The invention therefore does not make do with the mere absorption of harmful kinetic energy, as is the case in commonly used headrests, but it uses the kinetic energy for initiating active protective measures for the vehicle occupants, such as generating lateral supporting surfaces.

The implementation of this basic idea according to an embodiment of the invention provides for a kinematic coupling of energy-absorbing and therefore deforming function components within a headrest according to the invention, including function components for setting up lateral supporting surfaces. The kinematic coupling may be such that the absorption of the kinetic energy and generation of lateral supporting surfaces take place within the same function component. However, designs in which the described functions are assigned to multiple function components and which are operatively connected to each other, for example via a force-transmitting medium, are also within the scope of the invention.

As a first advantage of the invention, this results in a completely energy-autonomous operation of the headrest. Since the energy for setting up the lateral supporting surfaces comes from the kinetic energy of the head when being thrust into the headrest, it is not necessary to supply external energy.

Due to the kinematic coupling of the individual function units, it is also possible to dispense with a complex sensor system and a control device. This substantially simplifies the structure of a headrest according to the invention and permits it to be manufactured cost-effectively and compactly. The simplicity of the design also results in a high functional reliability, since the number of possible fault sources is inherently limited, due to the small number of parts.

Another advantage of the invention is derived from the direct setup of the lateral supporting surfaces as early as the time at which a head is thrust into the headrest. The completely instantaneous functionality resulting therefrom ensures that the protective action of the lateral supporting areas may take place very early on and therefore extremely effectively.

A first part of the embodiments of the invention according to the invention is based on the utilization of the fin ray effect. In this case, due entirely to a special lattice-like design, a supporting structure is created whose free ends move counter to the deformation direction during a deformation of the central area and form lateral supporting surfaces. This way of implementing the invention may consequently be carried out without great complexity and also has the advantage that the lateral supporting surfaces automatically adapt to the contour of the head and thus to its particular position. This results in an equalized and thus reduced pressure distribution on the head of a vehicle occupant.

In an embodiment of the invention, the lattice-like supporting structure comprises a front supporting strap and a rear supporting strap, which are opposite each other and are connected to each other at their facing ends at an acute angle $\beta$, while the two remaining ends end at a mutual distance from each other. The two supporting straps are connected to each other by articulated cross-struts. The cross-struts are advantageously positioned at an angle in relation to the front strap, i.e., they are inclined at an angle $\alpha$ in relation to the front supporting strap.

The selection of angle $\beta$ has an influence on the extent of the counter-movement of the supporting surfaces produced by a deformation and the stresses generated in the supporting structure by the deformation. At small angles $\beta$, a great counter-movement and high material stresses occur. Conversely, a large angle $\beta$ generates smaller induced counter-movements and a smaller material load. By suitably selecting angle $\beta$, therefore, the movement of the supporting surfaces as well as the material loads produced thereby may be determined. Taking these circumstances into account, angle $\beta$ in the range of 10° to 25°, preferably from 15° to 20°, has proven to be advantageous.

Via angle $\alpha$, it is possible to influence the deformation behavior of the supporting structure over its longitudinal extension. Small angles $\alpha$ result in larger curvatures of the two supporting straps, large angles $\alpha$ result in smaller curvatures. By suitably varying angle $\alpha$, the profile of the lateral supporting surfaces may be predetermined. For example, angle $\alpha$ of adjacent cross-struts may decrease, whereby the free ends of the lateral supporting surfaces are additionally curved and the supporting action is thus maintained up to the edge of the supporting surfaces. Angles $\alpha$ in the range of 30° to 75°, preferably from 40° to 65°, have proven to be suitable.

In an embodiment of the invention, a supporting structure of this type is designed to be symmetrical in relation to the median plane of a vehicle occupant and is highly preferably equipped with a synchronization mechanism. The synchronization mechanism guarantees a symmetrical deformation of the supporting structure in relation to the symmetry, even if the head of a vehicle occupant does not strike the headrest centrically, i.e., the median plane and the symmetry plane do not coincide.

In the embodiment described, all or a portion of the spaces formed between the supporting straps and cross-struts may be filled with an energy-absorbing material for the purpose of controlling the movement sequence over time.

Other embodiments of the invention provide for a fluid-based coupling of different function components. The head being thrust into a first function unit causes a fluid flow to be generated, which induces a movement of at least one additional function unit, by means of which the lateral supporting surfaces are set up on the headrest. By using a fluid of a suitable viscosity and by correspondingly selecting the line cross section for the fluid, it is possible to influence the speed of the movement sequences.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
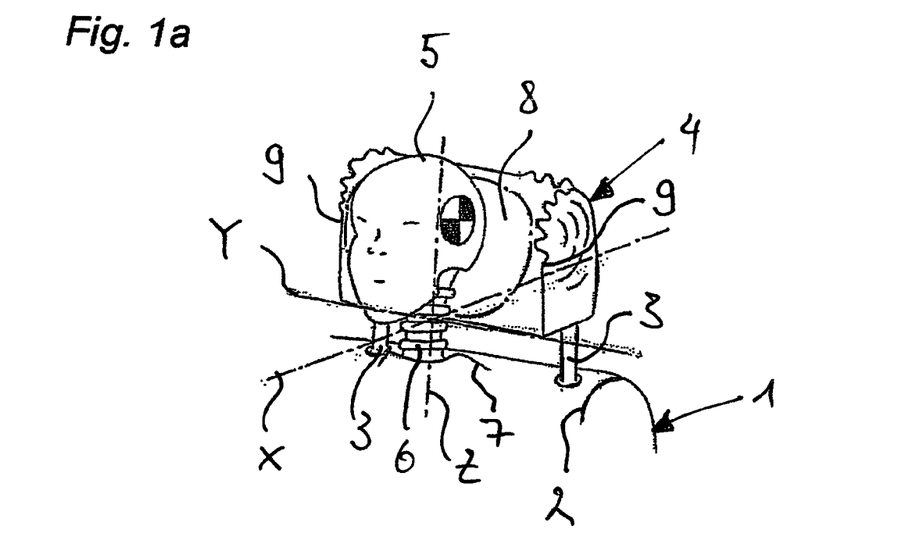
FIG. 1a shows an oblique view of a headrest according to the invention, including a head of a vehicle occupant situated in front thereof, before an accident event occurs.

FIG. 1a shows the upper area of a vehicle seat 1 from whose backrest 2 two holding rods 3 project for fastening a headrest 4 according to the invention. Head 5, including cervical spine 6, of a vehicle occupant whose torso is indicated by reference numeral 7 is shown in front of headrest 4.

In addition, FIG. 1a shows three orthogonally disposed spatial axes, of which the horizontal spatial axis pointing in the direction of travel is identified by X, the vertical spatial axis is identified by Z, and the spatial axis pointed transversely to the direction of travel is identified by Y. Axes X and Z span the median plane in relation to the vehicle passengers.

FIG. 1a shows the situation before an accident event occurs, in which head 5 is held at a distance from headrest 4. The area of headrest 4 which is located behind head 5 in the direction of travel has a central impact zone 8; the adjacent area on both sides in the Y direction is formed by lateral supporting surfaces 8, which are essentially still located on the plane of impact zone 8 at a point in time before the accident event.

Figure 1B:
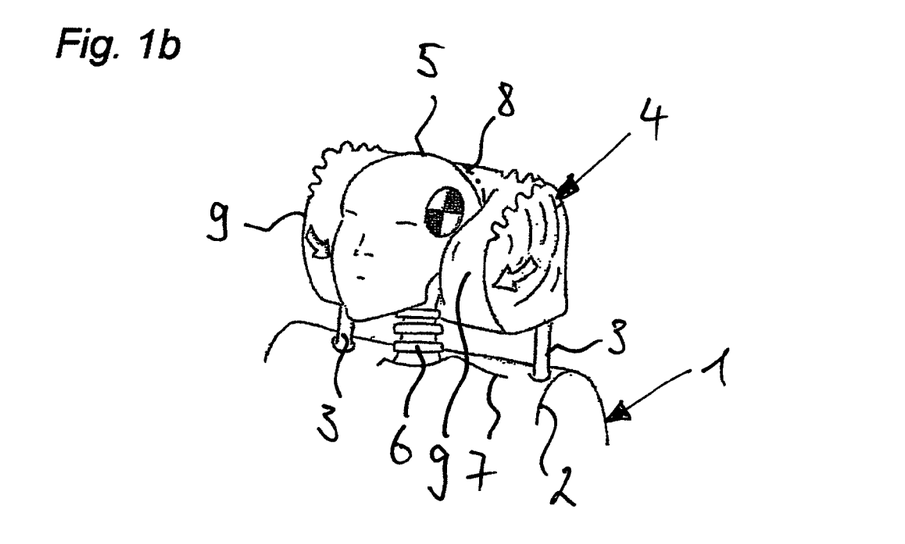
FIG. 1b shows the headrest illustrated in FIG. 1a, including a vehicle occupant, during the accident event.

Conversely, FIG. 1b shows a snapshot during an accident event. Head 5 is thrust into headrest 4 in the area of impact zone 8, means being activated after the thrusting action which absorb the kinetic energy of head 5 and convert it into a driving force for setting up lateral supporting surfaces 9 in the X direction.

FIGS. 2 through 14 show different embodiments of the aforementioned means, all embodiments having in common the fact that the kinetic energy of head 5 is converted directly into driving energy for lateral supporting surfaces 9, i.e., without any additional sensors and controllers and without supplying external energy. This permits an instantaneous stabilization reaction of the headrest, so that a possible wobbling movement of the head is absorbed as early as possible at a point in time at which no or only a minimal overextension of the neck musculature has taken place. The danger of a cervical spine whiplash trauma can thus be effectively ruled out, or at least greatly reduced.

Figure 2:
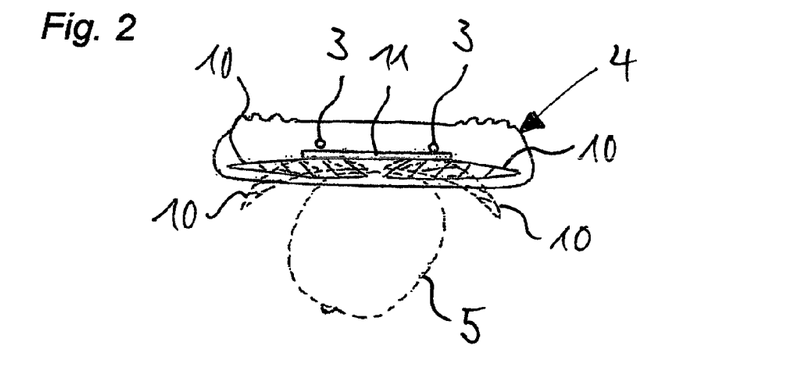
FIG. 2 shows a horizontal section of a first embodiment of a headrest according to the invention.
Figure 3:
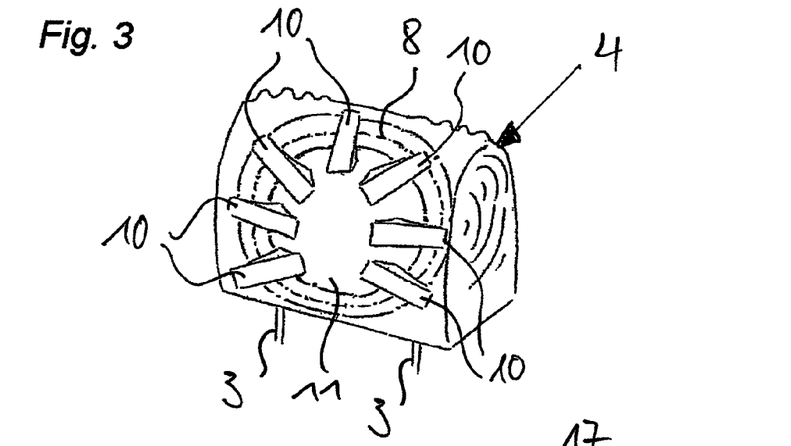
FIG. 3 shows an oblique view of the headrest illustrated in FIG. 2.
Figure 4:
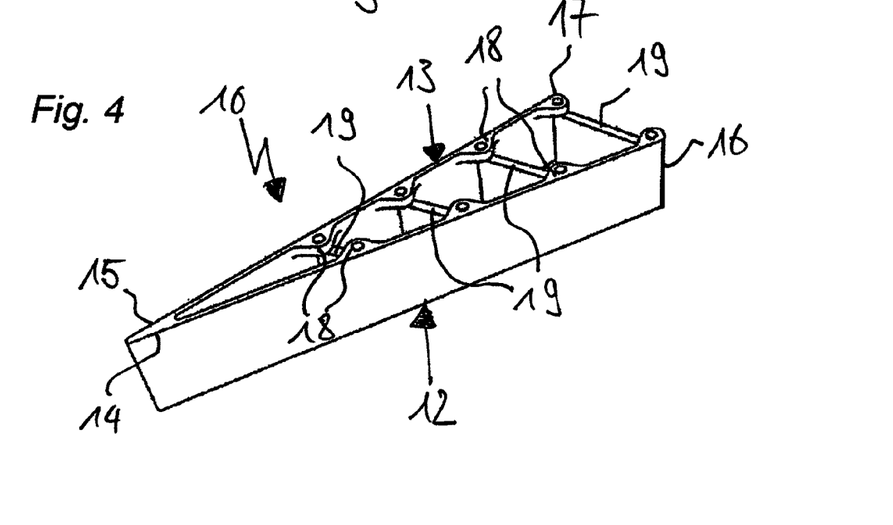
FIG. 4 shows an oblique view of a lattice-like supporting structure which is integrated into the headrest according to FIGS. 2 and 3.

FIGS. 2 through 10 relate to embodiments which are based on the implementation of the fin ray effect in connection with the activation of lateral supporting surfaces 9. FIGS. 2 through 4 show a first embodiment, in which headrest 4 is illustrated transparently to make it easier to see the means according to the invention. In this embodiment, multiple lattice-like supporting structures 10, as described in greater detail in FIG. 4, are disposed on a common baseplate 11 supported by holding elements 3. The baseplate has an approximately concentric position in relation to centric impact zone 8, individual lattice-like supporting structures 10 being oriented in a ray-shaped manner around the center, so that a head 5 being thrust into headrest 4 during an accident event applies compressive force oriented in the direction of the X axis to supporting structures 10.

FIG. 4 shows an oblique view of an isolated supporting structure 10 in its initial position, i.e., before an accident event. Supporting structure 10 has a front supporting strap 12 and a rear supporting strap 13, which converge at an acute angle β (FIG. 7) in the direction of their first ends 13, 14, illustrated on the left on the plane of projection, where they are rigidly connected to each other.

The linear course of front supporting strap 12 and rear supporting strap 13 in connection with acute angle β results in the fact that front supporting strap 12 and rear supporting strap 13 are disposed at a distance from each other at their diametrically opposed second ends 16, 17. Deviating herefrom, the course of front supporting strap 12 and/or rear supporting strap 13 may have a slight pre-curvature, provided that second ends 16 and 17 end at a mutual distance from each other in this case as well.

Pairs of diametrically opposed pivot bearings 18, on each of which cross-struts 19 are hinged, are disposed on diametrically opposed inner sides of front supporting strap 12 and rear supporting strap 13. The two supporting straps 12 and 13 are not interrupted by pivot bearings 18 but instead run past it, so that the action of a continuous support sets in with regard to the load transfer system. Pivot bearings 18, each of which forms a pair, have a slight offset in the longitudinal extension direction of supporting structure 10, resulting in a slight angled position of cross-struts 19 at an angle α in relation to front supporting strap 12. The angled position is such that cross-struts 19 are inclined toward the outside, starting from front supporting strap 12 to free first ends 14, 15. In the present exemplary embodiment, the angle of adjacent cross-struts 19 increases in the direction of first ends 14, 15 and is 60°, for example, for cross-strut 19 forming second end 16, 17 and 45° for cross-strut 19 closest to first end 14, 15. The inclined position of cross-struts located therebetween may be determined by interpolation. Instead of pivot bearings 18, cross-struts 19 may also be joined to front supporting strap 12 and rear supporting strap 13 via live hinges.

Lattice-like supporting structures 10 designed in this manner are each connected to baseplate 11 by their rear supporting straps 13 in the area of second ends 16, 17 and cushioned in the direction of the front side of headrest 4.

If a head 5, as illustrated by the dashed line in FIG. 2, is thrust into impact zone 8 of a headrest 4, the compressive force acting upon front support strap 12 induces a deformation of supporting structures 10, whose first ends 14, 15 are each moved counter to the direction of force, i.e., in the direction of travel, and in this manner form lateral and upper supporting surfaces 9 around all spatial axes X, Y and Z to stabilize head 5.

Figure 5:
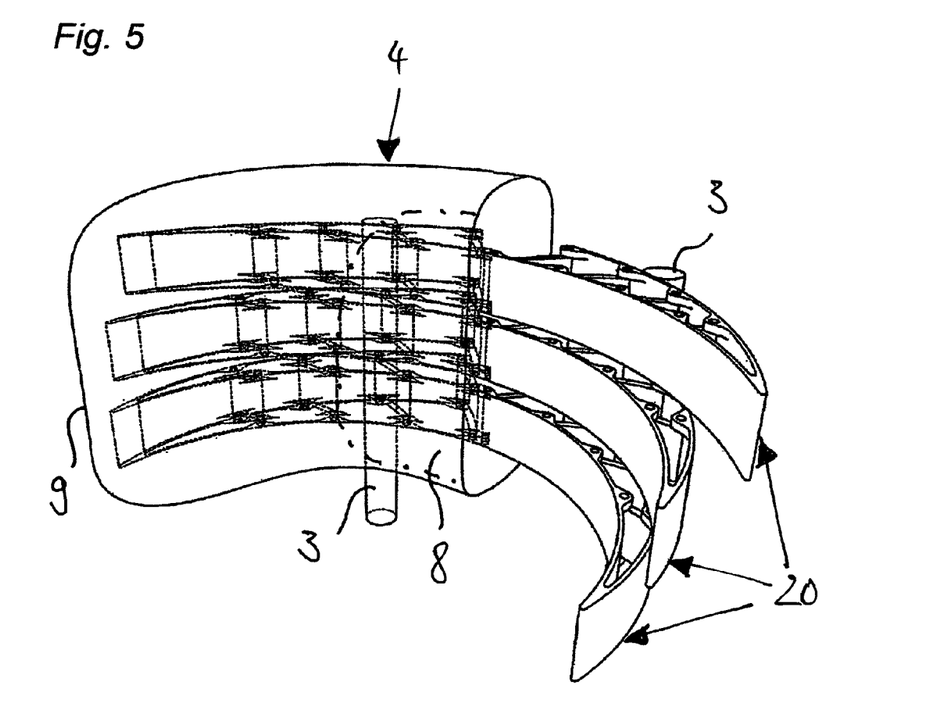
FIG. 5 shows an oblique view of a second embodiment of a headrest according to the invention in a half exposed representation.
Figure 6:
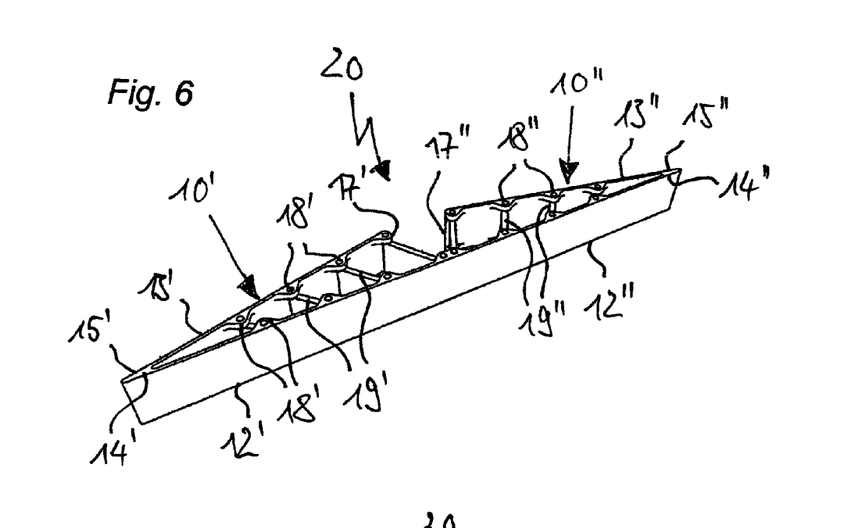
FIG. 6 shows an oblique view of a supporting structure which is integrated into the headrest according to FIG. 5.
Figure 7:
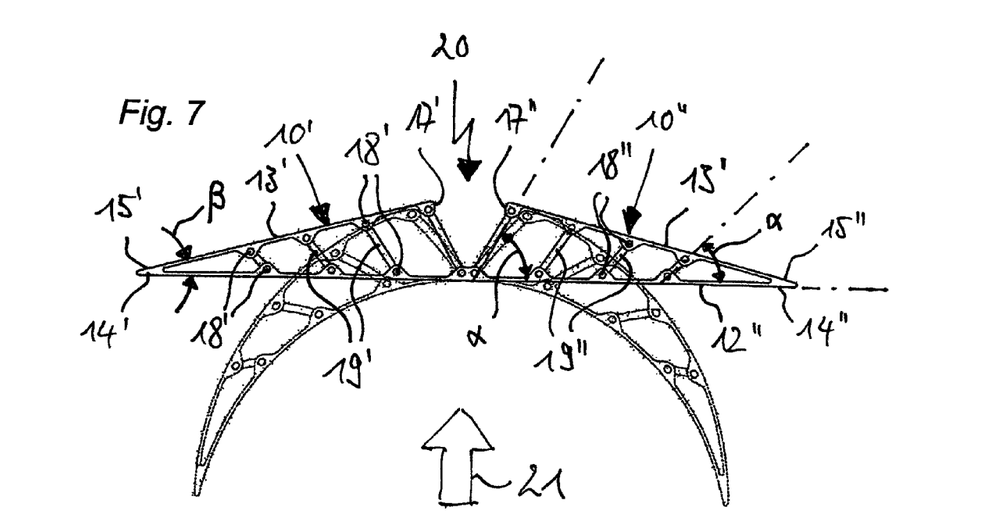
FIG. 7 shows a top view of the supporting structure illustrated in FIG. 6.

An embodiment of the invention which builds thereupon is illustrated in FIGS. 5, 6 and 7. FIG. 5 shows a corresponding headrest 4 which is exposed on the symmetry plane in order to clearly illustrate the invention. The embodiment according to FIGS. 5 through 7 has three lattice-like supporting structures 20 which are located on vertically staggered horizontal planes and which are described in greater detail under FIGS. 6 and 7. Instead of three supporting structures 20, fewer or more supporting structures 20 may also be provided. Supporting structures 20 may also be inclined around the Y axis toward the center of gravity of head 5 in order to counteract a movement of head 5 around the Y axis.

Lattice-like supporting structures 20 may be foam-injected into, for example, headrest 4, whereby they are possibly disposed directly in front of the holding structure epitomized by holding rods 3. A headrest 4 of this type brings about a stabilization of a head 5 during movements around the X and Z axes.

As is apparent, in particular, from FIGS. 6 and 7, lattice-like supporting structure 20 is formed by two supporting structures 10', 10" according to FIGS. 2 through 4 in a mirror-image configuration, whose two front supporting straps 12' and 12" continuously merge with each other monolithically on the symmetry plane, which normally coincides with the median plane, thus forming a common front supporting strap 12' 12" in this manner. Conversely, rear supporting straps 13', 13" are not connected to each other.

Due to the other correspondences with lattice-like supporting structures 10 according to FIGS. 2 through 4, reference is hereby made to the discussion of these figures, in particular with regard to their geometry.

The deformation of lattice-like supporting structure 20 during an accident event is shown in the dashed representation in FIG. 7. The pressure applied by head 5 is symbolized by arrow 21. This force 21 induces a concave deformation of front supporting strap 20', 20", which, due to the lattice effect, causes first ends 14', 15' and 14", 15" to move counter to force 21 symmetrically to the symmetry plane and to set up lateral supporting surfaces 9 in headrest 4 over the course of this movement.

Figure 8:
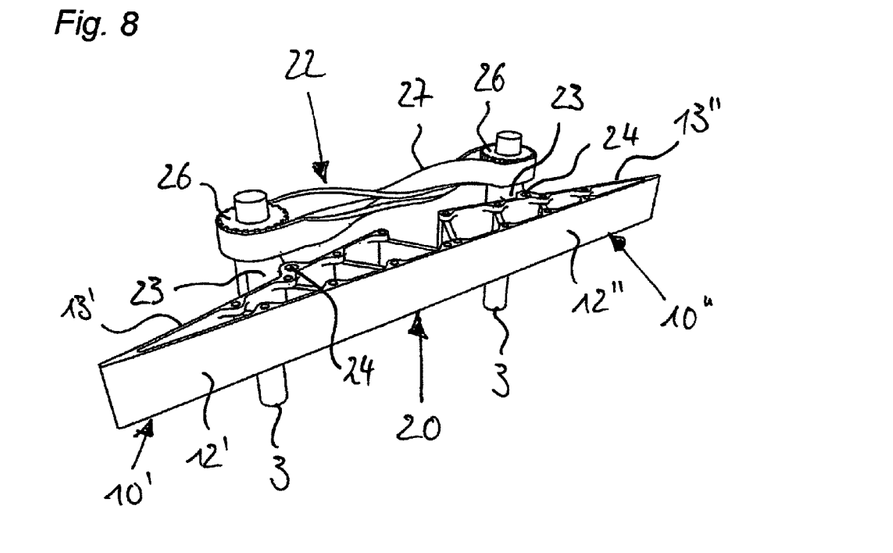
FIG. 8 shows an oblique view of the supporting structure illustrated in FIG. 6 to which synchronization components are added.
Figure 9:
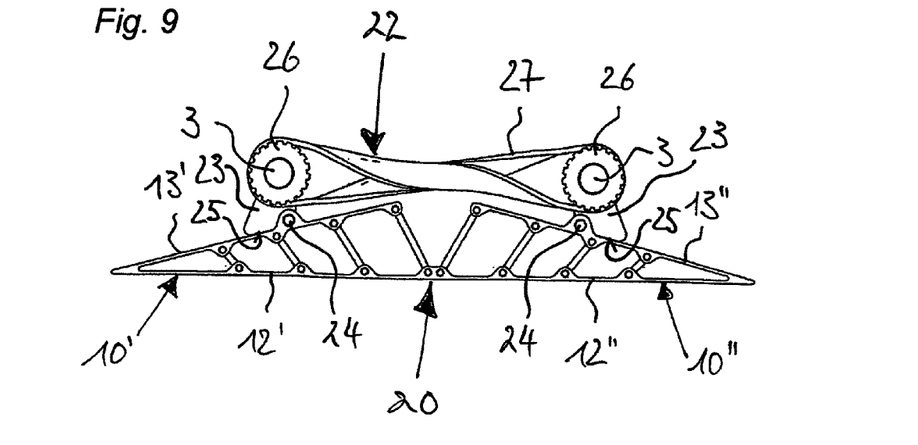
FIG. 9 shows a top view of the supporting structure illustrated in FIG. 8.

The embodiment of the invention illustrated in FIGS. 8 and 9 relates to a refinement of the lattice-like supporting structure 20 described in FIGS. 5 through 7, so that reference is hereby made to the discussions thereof to avoid repetition.

To supporting structure 20 according to FIGS. 8 and 9 is added a holding and synchronization mechanism 22, by means of which lattice-like supporting structure 20 is fastened to vertical axes, preferable to holding rods 3 of headrest 4.

Holding and synchronization mechanism 22 comprises two articulated levers 23, each of which is rotatably positioned on holding rod 3 by one end and connected to rear supporting strap 13', 13" of supporting structure 20 by its other end via a pivot joint 24. In the area of pivot joint 24, each articulated lever 23 has a foot 24 which is spread to the outside in the direction of first ends 14', 15' and 14", 15", which acts as a stop for the swiveling movement. In the initial position of headrest 4, foot 25 joins each of rear supporting straps 13', 13".

To synchronize the deformation movement of the two mirror-image parts 10' and 10" of supporting structure 20 during the course of the impact of head 5, a toothed wheel 26 is pushed onto each holding rod 3, which is rigidly connected to articulated levers 23, for example by forming a single piece therewith or by gluing, but which otherwise may rotate with articulated level 23. Finally, the synchronization activates a cam belt 27, which is guided around both toothed wheels 26 and is wound 180°.

In this manner, an absolutely symmetrical deformation of supporting structure 20, and thus a symmetrical setup of lateral supporting surfaces 9, is ensured even if head 5 is thrust eccentrically into headrest 4.

Figure 10:
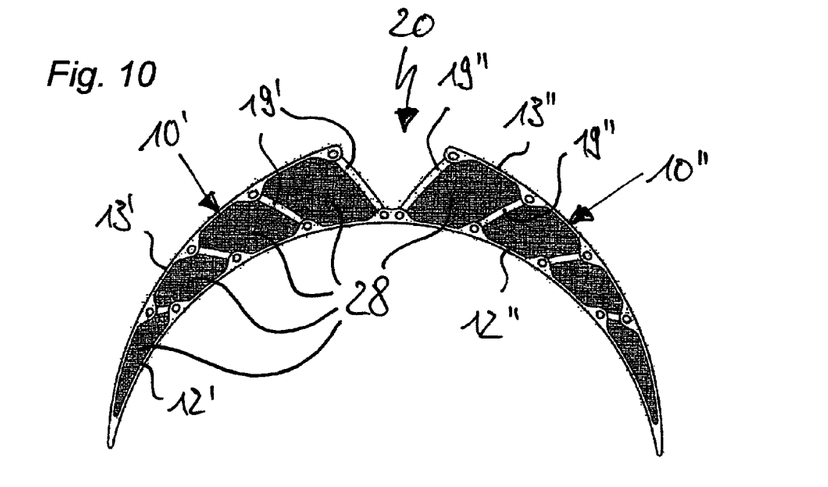
FIG. 10 shows a top view of the supporting structure illustrated in FIG. 6, to which damping components are added.

FIG. 10 finally shows a modification of lattice-like supporting structure 20 described in FIGS. 5 through 9, in which the cells formed by front supporting straps 12', 12", rear supporting straps 13', 13" and cross-struts 19', 19" are filled with an elastic or plastically deformable and energy-absorbing material 28, for example with a foam, gel or the like. Filling material 28 induces a damping of the deformation movement, it being possible to influence the speed curve of the deformation movement by selecting a suitable filling material 28. In FIG. 10, all cells are filled with a material 28, which, however, does not rule out the possibility of filling only individual cells with a material 28, while other cells remain empty, in order to achieve a special deformation characteristic. It is furthermore possible to also dampen supporting structures 20 described in FIGS. 2 through 4 in a similar manner.

The other embodiments of the invention according to FIGS. 11 through 14 provide for activation of lateral supporting surfaces 9 of a headrest 4 on the basis of multiple communicating, fluid-filled volumes, the volume reduction of one volume causing the growth of other volumes to form supporting surfaces 9.

Figure 11:
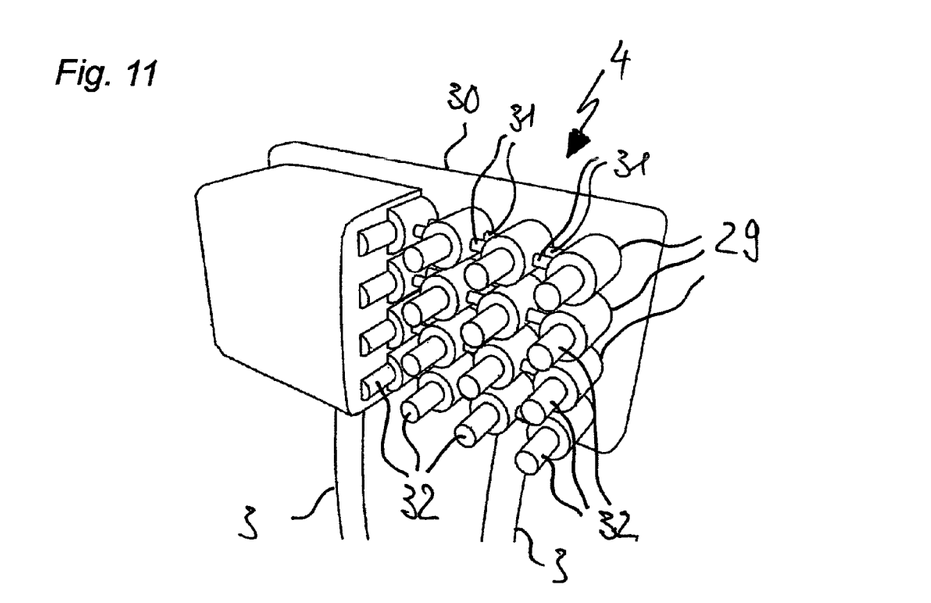
FIG. 11 shows an oblique view of another, fluid-based embodiment of a headrest according to the invention in a half exposed representation, before the accident event occurs.
Figure 12:
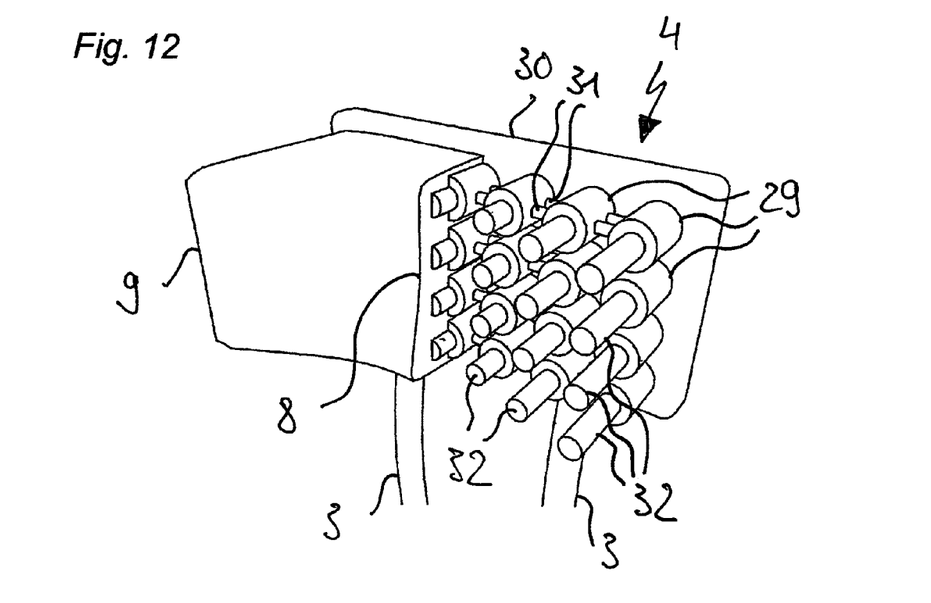
FIG. 12 shows the headrest illustrated in FIG. 11 during the accident event.

To implement this idea, in a headrest 4 according to FIGS. 11 and 12, a plurality of cylinder piston units 29 are disposed in a matrix-like manner on a supporting plate 30 in the direction of travel. Supporting plate 30, in turn, is fastened to holding rods 3. Individual cylinder piston units 29 are connected to each other via lines 31 and in this manner form a closed communication system filled with a fluid such as oil or gas, which may be foam-injected, for example, into a headrest 4. It is apparent from FIG. 11 that moving pistons 32 of cylinder piston units 29 are inserted or extended approximately halfway in the initial state of headrest 4.

Figure 14:
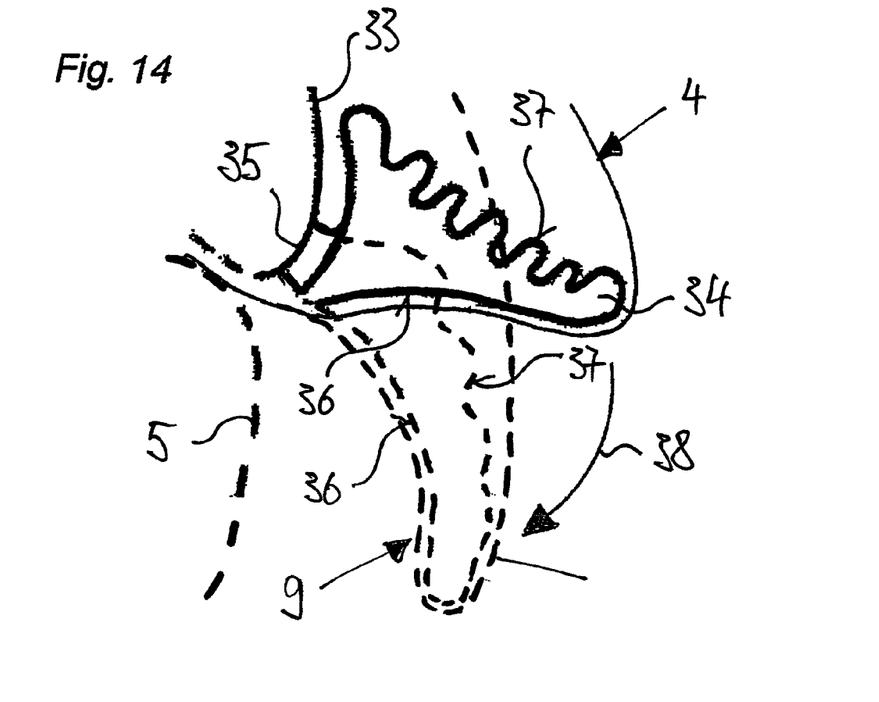
FIG. 14 shows a detail of the area identified by XIV in FIG. 13.

FIG. 14 represents the state of headrest 4 after a head 5 has been thrust into it during an accident event. It is apparent that cylinder piston units 29 disposed in the area of impact zone 8 have inserted pistons 32 due to the force applied thereto. During the course of the inwardly directed piston movement, the volume in cylinder piston units 29 is reduced, and the fluid located therein is displaced via lines 32 into less loaded or unloaded cylinder piston units 29. At this location, moving pistons 32 are extended linearly in the direction of travel by the pressure of the fluid and, due to their anisotropic deformation behavior, form lateral supporting surfaces 9 which counteract a movement of head 5 around the X and/or Z axes.

Figure 13:
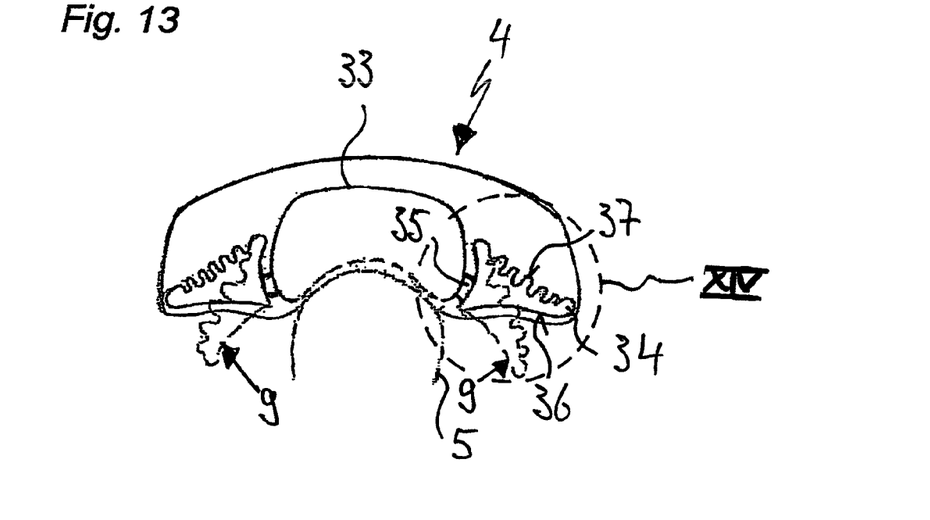
FIG. 13 shows a horizontal section of an additional fluid-based embodiment of a headrest according to the invention.

Finally, FIGS. 13 and 14 show an embodiment of the invention, in which a compressible impact cushion 33, which is filled with fluid such as oil or gas, is integrated in the area of central impact area 8. An expansion cushion 34 disposed on each side of impact cushion 33 is connected to the volume of impact cushion 33 via lines 35. Each expansion cushion 34 has an approximately triangular contour, viewed from the top, having a first side facing impact cushion 33, a second side 36 facing the front of headrest 4 and a rear side 37 facing the back of headrest 4. Rear side 37 of expansion cushion 34 has a wavy or pleated design to permit widening of expansion cushion 34 along this side 37.

If head 5 of a vehicle occupant is thrust into impact cushion 33 during an accident, fluid is pumped into expansion cushions 34 via lines 35 during the course of the volume decrease of impact cushion 33 associated therewith, the expansion cushions 34 subsequently increasing in volume. Since each expansion cushion 34 is made of a non-expandable or only slightly expandable material, the volume increase of expansion cushion 34 takes place primarily by an elongation of rear side 37, which permits an unhindered increase in length, due to its wavy or pleated design. Since front side 36 does not have this ability to increase in length, a swiveling movement of expansion cushion 34 toward the front in the direction of travel sets in, which is identified by arrow 38, front side 36 of expansion cushion 34 forming lateral supporting surfaces 9 for stabilizing a head 5. This state is illustrated by the dashed lines in FIGS. 13 and 14. The course of movement may be controlled by selecting the viscosity of the fluid and/or by providing a throttle in line 35.

It is understood that the invention is not limited to the combination of features of the embodiments described above. Instead, a combination of features of different embodiments is within the scope of the invention, provided that they are readily apparent to the average person skilled in the art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A headrest of a vehicle seat comprising:
  a deformable, central supporting body which forms an impact zone for a head of a vehicle occupant, and in which the kinetic energy of the head is introduced during an accident;
  lateral supporting surfaces adjacent to both sides of the central supporting body, which are extendable from a plane of the headrest, and which inwardly deform, for laterally supporting the head; and
  a component for absorbing the kinetic energy introduced into the central supporting body and for outputting the absorbed energy for activating lateral supporting surfaces,
  wherein the component includes at least one lattice-like supporting structure that has a structure with a fin ray effect, and
  wherein the at least one lattice-like supporting structure having a front supporting strap and a rear supporting strap, which is not parallel thereto, a first end of the front supporting strap being connected to a first end of the rear supporting strap at an acute angle, a second end of the front supporting strap being disposed at a distance from a second end of the rear supporting strap, and cross-struts which interconnect the front supporting strap and the rear supporting strap being disposed in a free space between the front supporting strap and the rear supporting strap.

2. The headrest according to claim 1, wherein each of the rear supporting strap and the front supporting strap has a continuous design, and the cross-struts are connected to each of the rear supporting strap and the front supporting strap in an articulated manner.

3. The headrest according to claim 1, wherein each of the rear supporting strap and the front supporting strap enclose an angle β of 10° to 25°.

4. The head rest according to claim 3, wherein the angle β of 15° to 20°.

5. The headrest according to claim 1, wherein the cross-struts and the front supporting strap enclose an angle α of 30° to 75°.

6. The head rest according to claim 5, wherein the angle α of 40° to 65°.

7. The headrest according to claim 5, wherein the angle α of two adjacent cross-struts decreases in the direction of the pointed end of the supporting structure.

8. The headrest according to claim 1, wherein the component is mounted on two axes in a symmetrically pivoting manner, the axes being formed by the holding rods via which the headrest is fastened to the vehicle seat.

9. The headrest according to claim 8, wherein the headrest has a holding and synchronization mechanism for a symmetrical synchronization of the component.

10. The headrest according to claim 1, wherein an energy-absorbing material is integrated into the lattice-like supporting structure.

11. A headrest of a vehicle seat comprising:
  a deformable, central supporting body which forms an impact zone for a head of a vehicle occupant, and in which the kinetic energy of the head is introduced during an accident,
  lateral supporting surfaces adjacent to both sides of the central supporting body, which are extendable from a plane of the headrest, and which inwardly deform, for laterally supporting the head; and a component for absorbing the kinetic energy introduced into the central supporting body and for outputting the absorbed energy for activating lateral supporting surfaces, wherein the component includes at least one lattice-like supporting structure that has a structure with a fin ray effect, and wherein the at least one lattice-like supporting structure having a front supporting strap and having two rear supporting straps which are not parallel thereto, two ends of the front supporting strap each being connected to first ends of the two rear supporting straps at an acute angle, and second ends of the two rear supporting straps being disposed at a distance from the front supporting strap, and cross-struts which connect the two rear supporting straps to the front supporting strap being disposed in an enclosed free space between the front supporting strap and the two rear supporting straps.

12. The head rest according to claim 11, wherein the component is mounted on two axes in a symmetrically pivoting manner, the axes being formed by holding rods via which the headrest is fastened to the vehicle seat.

13. A headrest of a vehicle seat comprising:

a deformable, central supporting body which forms an impact zone for a head of a vehicle occupant, and in which the kinetic energy of the head is introduced during an accident;

lateral supporting surfaces adjacent to both sides of the central supporting body, which are extendable from a plane of the headrest, for laterally supporting the head; and a component for absorbing the kinetic energy introduced into the central supporting body and for outputting the absorbed energy for activating lateral supporting surfaces, wherein the component includes a closed system having at least three communicating, fluid-filled volumes, the first volume being compressible and disposed in the area of the impact zone, and the at least two other volumes being expandable and disposed in the area of the lateral supporting surfaces so that in the event of a volume decrease of the first volume during the course of the impact of the head a volume increase of the at least two additional volumes may be activated in the direction of travel, due to a flow of the fluid into the at least two additional volumes, and the first volume and the at least two additional volumes are formed by a plurality of cylinder piston units which telescope in the direction of travel and are disposed in the impact zone.

14. A headrest of a vehicle seat comprising:

a deformable, central supporting body which forms an impact zone for a head of a vehicle occupant, and in which the kinetic energy of the head is introduced during an accident;

lateral supporting surfaces adjacent to both sides of the central supporting body, which are extendable from a plane of the headrest for laterally supporting the head; and a component for absorbing the kinetic energy introduced into the central supporting body and for outputting the absorbed energy for activating lateral supporting surfaces, wherein the component includes at least one lattice-like supporting structure having a front supporting strap and a rear supporting strap, which is not parallel thereto, a first end of the front supporting strap being connected to a first end of the rear supporting strap at an acute angle, a second end of the front supporting strap being disposed at a distance from a second end of the rear supporting strap, and cross-struts which interconnect the front supporting strap and the rear supporting strap being disposed in a free space between the front supporting strap and the rear supporting strap, and wherein the component is mounted on two axes in a symmetrically pivoting manner, the axes being formed by the holding rods via which the headrest is fastened to the vehicle seat.

\* \* \* \* \*